Figures 1, 2:
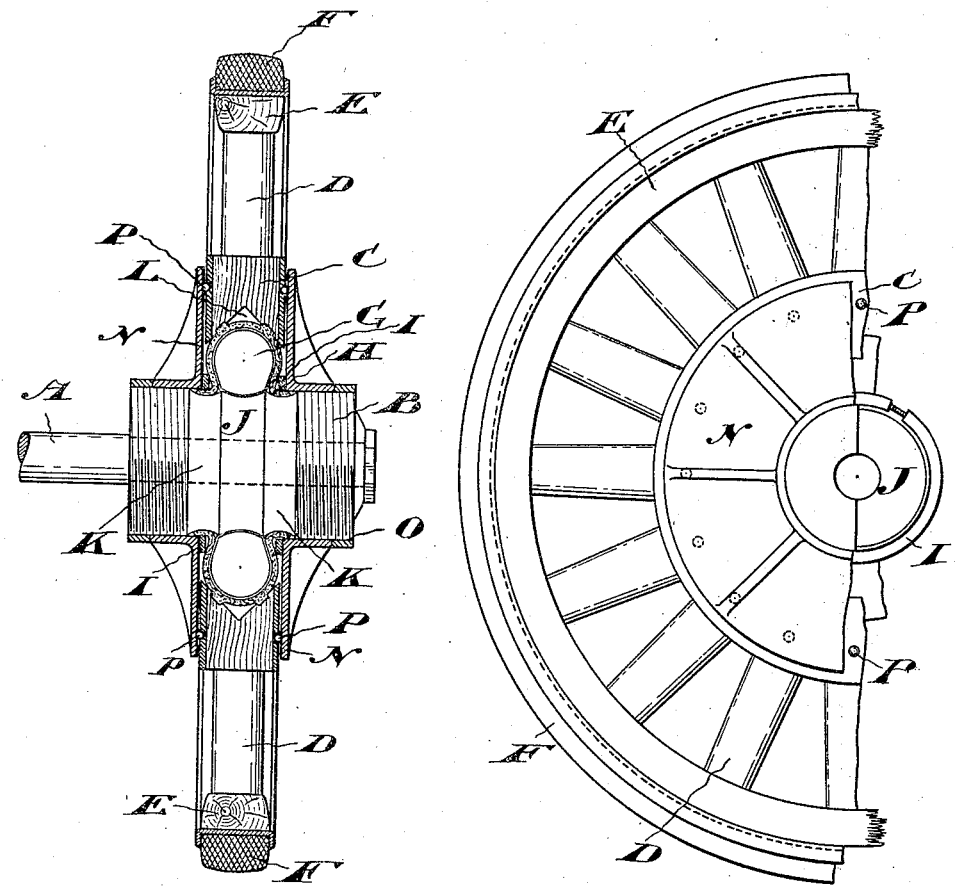

UNITED STATES PATENT OFFICE.

BERTON H. SILLS, OF BELLEVILLE, ONTARIO, CANADA, ASSIGNOR OF ONE-FOURTH TO WILLIAM S. CONGER AND ONE-FOURTH TO STANLEY E. CARMAN, OF BELLEVILLE, ONTARIO, CANADA.

WHEEL.

No. 848,325.      Specification of Letters Patent.      Patented March 26, 1907.

Application filed November 4, 1905. Serial No. 285,920.

*To all whom it may concern:*

Be it known that I, BERTON H. SILLS, of the city of Belleville, in the county of Hastings, in the Province of Ontario, Canada, have invented certain new and useful Improvements in Wheels, of which the following is a specification.

My object is to devise a wheel which in use will present all the advantages of one provided with a pneumatic tire without the attendant disadvantages; and my invention consists, essentially, in dividing the wheel-hub into two concentric parts, in providing between them a flexible pneumatic tube or cushion, and in means holding the outer part of the hub from lateral displacement, substantially as hereinafter more specifically described and then definitely claimed.

Figure 1 is a cross-section of my improved wheel. Fig. 2 is a side elevation of half of the same.

In the drawings like letters of reference indicate corresponding parts in the different figures.

A is the axle; B, the inner hub, which will be suitably journaled on the axle in any ordinary well-known manner.

C is the outer hub, to which are connected the spokes D and the felly E. The felly is preferably provided with a solid rubber tire F.

The inner hub B has centrally clamped thereon a pneumatic tire or cushion G. While this may be of any construction, I find the following arrangement possesses many advantages. In this I employ a tire provided with an outer and inner tube, the outer tube being provided with side flanges H, clamped on the inner hub by means of clamping-bands I, drawn up by right and left handed screws in the ordinary manner. The hub is provided with a circumferential groove J to receive the inner tube of the tire and with the grooves K to receive the side flanges H. The inner side of the hub C has a V-shaped groove L formed therein to receive the cushion G. There is sufficient space left between the two hubs to enable the outer hub to be placed in position over the cushion G when the latter is deflated. As soon, however, as the latter is inflated it rises within the groove in the outer hub and is expanded tightly into contact therewith, forming a secure driving connection between the two. As a further security the tread of the cushion may be roughened or corrugated at each side, as shown, and the groove of the inner hub similarly corrugated to receive the projections.

In order to prevent side play, I secure upon the hub B flanges N, preferably annular. The outer flange is preferably screwed in place so that it may be removed and is locked by means of a lock-nut O. These flanges are preferably stiffened with ribs, as shown.

To avoid friction, I prefer to place between the flanges and the outer hub the balls P, held in position in suitable cups formed either in the flanges or the hub.

From the construction described it will be seen that any pressure on the rim or tire of the wheel is carried by the pneumatic cushion G, which will yield to ease the shock of sudden jars. The two parts of the wheel being entirely independent save for their connection by the pneumatic cushion, the outer part of the wheel is free to yield in any direction to a shock except laterally, in which direction it must necessarily be restrained and is restrained by the flanges N.

As the wheel is preferably provided with solid rubber tires, these absorb the vibrations due to contact with small obstacles, while the shocks of contact with larger obstacles or roughnesses in the road are absorbed by the pneumatic cushion. Such a wheel, it will be seen, presents all the advantages of the ordinary pneumatic-tired wheel and possesses none of its disadvantages. No punctures need be feared, and the annoyance, expense, and delay due to this cause is entirely avoided. Further, the pneumatic cushion being much smaller than a pneumatic tire of ordinary size is very much cheaper, and owing to its protected position and freedom from wear will outlast many pneumatic tires. The outer solid rubber tires need not be heavy, and hence are comparatively cheap.

What I claim as my invention is—

1. In a wheel the combination of an inner cylindrical hub having a central annular groove formed therein, and an annular groove at each side of the central groove; a pneumatic cushion having its inner side lying in said central groove and provided with side flanges engaging the side grooves; clamping-bands adapted to clamp the side flanges in the grooves; an outer hub grooved to engage the outer side of the pneumatic cushion; and means for holding the parts of the hub in alinement, substantially as described.

2. In a wheel the combination of an inner cylindrical hub having a central annular groove formed therein, and an annular groove at each side of the central groove and a pneumatic cushion provided with side flanges engaging the side grooves; clamping-bands adapted to clamp the side flanges in the grooves; an outer hub provided with a V-shaped groove to engage the outer side of the pneumatic cushion; and means for holding the parts of the hub in alinement, substantially as described.

3. In a wheel the combination of an inner cylindrical hub having a central annular groove formed therein; a pneumatic cushion having its inner side lying in said central groove and provided with side flanges engaging the side grooves; clamping-bands adapted to clamp the side flanges on the hub; an outer hub grooved to engage the outer side of the pneumatic cushion; and means for holding the parts of the hub in alinement, substantially as described.

4. In a wheel the combination of an inner cylindrical hub having a central annular groove formed therein, and an annular groove at each side of the central groove; a pneumatic cushion having its inner side lying in said central groove and provided with side flanges engaging the side grooves; clamping-bands adapted to clamp the side flanges on the hub; an outer hub provided with a V-shaped groove to engage the outer side of the pneumatic cushion; and means for holding the parts of the hub in alinement, substantially as described.

5. In a wheel the combination of a hub divided into two concentric portions; an annular pneumatic cushion normally substantially circular in cross-section interposed between the two parts and secured to the inner part, the other part being provided with an acute V-shaped groove to engage the cushion at each side of the tread of the latter, substantially as described.

6. In a wheel the combination of a hub divided into two concentric portions; an annular pneumatic cushion substantially circular in cross-section interposed between the two parts, one part being provided with an acute V-shaped groove; and side flanges on one part engaging the outer sides of the other part to prevent side play, substantially as described.

Toronto, October 27, 1905.

BERTON H. SILLS.

In presence of—
C. D. DYKE,
W. N. BELAIR.